(12) United States Patent
Nagata et al.

(10) Patent No.: US 10,150,335 B2
(45) Date of Patent: Dec. 11, 2018

(54) BEARING DEVICE FOR A WHEEL

(71) Applicant: NTN CORPORATION, Osaka (JP)

(72) Inventors: Tsutomu Nagata, Shizuoka (JP); Takayuki Norimatsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 335 days.

(21) Appl. No.: 14/903,849

(22) PCT Filed: Jun. 16, 2014

(86) PCT No.: PCT/JP2014/065931
§ 371 (c)(1),
(2) Date: Jan. 8, 2016

(87) PCT Pub. No.: WO2015/008569
PCT Pub. Date: Jan. 22, 2015

(65) Prior Publication Data
US 2016/0159145 A1    Jun. 9, 2016

(30) Foreign Application Priority Data

Jul. 16, 2013 (JP) .................................. 2013-147645

(51) Int. Cl.
*B60B 27/00* (2006.01)
*F16C 35/063* (2006.01)
(Continued)

(52) U.S. Cl.
CPC ...... *B60B 27/0042* (2013.01); *B60B 27/0026* (2013.01); *B60B 27/0031* (2013.01);
(Continued)

(58) Field of Classification Search
CPC .............. B60B 27/0005; B60B 27/001; B60B 27/0026; B60B 27/0031; B60B 27/0042;
(Continued)

(56) References Cited

U.S. PATENT DOCUMENTS 3,472,303 A * 10/1969 Beard .................... F16B 41/002
411/408
5,388,940 A * 2/1995 Herren ...................... B07B 1/46
209/403
(Continued)

FOREIGN PATENT DOCUMENTS

CN        103180150       6/2013
JP        2003-335105     11/2003
(Continued)

OTHER PUBLICATIONS

Translation of JP2009097557, generated Feb. 1, 2018.*
(Continued)

*Primary Examiner* — Matthew P Travers
(74) *Attorney, Agent, or Firm* — Wenderoth, Lind & Ponack, L.L.P.

(57) ABSTRACT

An assembling method includes fitting an entire range of the guide portion to the stem section with a gap therebetween, and inserting a bolt from an outboard side through a bolt insertion hole formed in the hub wheel. In this state, a maximum inclination angle of the bolt with respect to the hub wheel is set to be larger than a maximum inclination angle of the outer joint member with respect to the hub wheel. The method also includes connecting the bearing and the constant velocity universal joint to each other by threadedly engaging and fastening the bolt into a bolt hole formed in the stem section.

4 Claims, 14 Drawing Sheets

(51) Int. Cl.
  *F16D 1/072* (2006.01)
  *F16D 3/223* (2011.01)
  *F16C 19/18* (2006.01)

(52) U.S. Cl.
  CPC ...... *B60B 27/0094* (2013.01); *F16C 35/0635* (2013.01); *F16D 1/072* (2013.01); *F16D 3/223* (2013.01); *B60B 27/001* (2013.01); *B60B 27/0084* (2013.01); *B60B 2310/316* (2013.01); *B60B 2900/113* (2013.01); *F16C 19/186* (2013.01); *F16C 2326/02* (2013.01); *F16D 2003/22326* (2013.01)

(58) Field of Classification Search
  CPC .......... B60B 27/0094; B60B 2310/316; B60B 2900/113; B60B 2900/115; B60B 2900/121; Y10T 403/7026; Y10T 403/7032; Y10T 403/7035; Y10T 29/49696; Y10T 29/49945; F16C 35/0635; F16C 2326/02; F16D 1/072; F16D 3/223; F16D 2003/22326; B23P 11/02
  See application file for complete search history.

(56) References Cited

U.S. PATENT DOCUMENTS

| | | | | |
|---|---|---|---|---|
| 5,395,194 | A * | 3/1995 | Johnson | F16B 5/025 29/525.11 |
| 5,782,595 | A * | 7/1998 | Schneider | F16B 5/025 411/107 |
| 5,806,936 | A | 9/1998 | Guimbretière | |
| 2007/0014650 | A1 * | 1/2007 | Hain | F16B 5/0208 411/353 |
| 2007/0227004 | A1 * | 10/2007 | Tsuzaki | B60B 27/0005 29/898 |
| 2008/0152424 | A1 * | 6/2008 | Igarashi | F16D 1/101 403/359.6 |
| 2013/0172088 | A1 | 7/2013 | Umekida et al. | |
| 2015/0273939 | A1 * | 10/2015 | Mochinaga | F16C 19/186 301/6.1 |
| 2015/0321511 | A1 * | 11/2015 | Mochinaga | B60B 27/0026 301/6.1 |
| 2016/0016431 | A1 * | 1/2016 | Norimatsu | B60B 27/0005 384/544 |

FOREIGN PATENT DOCUMENTS

| | | |
|---|---|---|
| JP | 2009-97557 | 5/2009 |
| JP | 2011-225153 | 11/2011 |
| JP | 2012-62013 | 3/2012 |
| JP | 2013-79063 | 5/2013 |

OTHER PUBLICATIONS

Translation of JP2013079063, generated Feb. 1, 2018.*
International Search Report dated Aug. 26, 2014 in International (PCT) Application No. PCT/JP2014/065931.
English Translation of the International Preliminary Report on Patentability and Written Opinion of the International Searching Authority dated Jan. 19, 2016 in the International Application No. PCT/JP2014/065931.
Chinese Search Report with Chinese Office Action dated Jan. 23, 2017 in corresponding Chinese Application No. 201480038076.1 (with partial English translation).

* cited by examiner

BEARING DEVICE FOR A WHEEL

TECHNICAL FIELD

The present invention relates to a bearing device for a wheel, which is configured to rotatably support a driving wheel (front wheel of a front-engine front-drive (FF) vehicle, rear wheel of a front-engine rear-drive (FR) vehicle, and all wheels of a four-wheel drive (4WD) vehicle with respect to, for example, a suspension device for an automobile.

BACKGROUND ART

As a related-art bearing device for a wheel, for example, there is proposed a bearing device for a wheel, which is configured so that a hub wheel is separable from an outer joint member of a constant velocity universal joint to attain excellent maintainability (see, for example, Patent Literature 1). As illustrated in FIG. 14, the bearing device for a wheel as described in Patent Literature 1 includes, as main components thereof, a fixed type constant velocity universal joint 106, and a bearing 120 for a wheel including a hub wheel 101, an inner ring 102, double-row rolling elements 103 and 104, and an outer ring 105. In the bearing device for a wheel, a stem section 130 of an outer joint member 124 of the fixed type constant velocity universal joint 106 is press-fitted into a shaft hole 138 of the hub wheel 101. Further, a bolt 142 is inserted from an outboard side (left side in FIG. 14) through a bolt insertion hole 146 of the hub wheel 101, and the bolt 142 is threadedly engaged into a bolt hole 141 formed in an end portion of the stem section 130 on the outboard side. In this manner, the outer joint member 124 and the hub wheel 101 are fixed to each other.

In the above-mentioned bearing device for a wheel, as illustrated in FIG. 15 and FIG. 16, when the stem section 130 of the outer joint member 124 is press-fitted into the shaft hole 138 of the hub wheel 101, convex portions 137 of the stem section 130 of the outer joint member 124 are transferred onto an inner peripheral surface of the shaft hole 138 of the hub wheel 101. In this manner, concave portions 140 that are held in close contact with the convex portions 137 with interferences are formed in the inner peripheral surface of the shaft hole 138 of the hub wheel 101, and there is defined a convex and concave fitting structure in which the convex portions 137 and the concave portions 140 are held in close contact with each other in an entire range of a fitting portion therebetween. Thus, the outer joint member 124 and the hub wheel 101 are coupled to each other so as to allow torque transmission therebetween. At this time, as illustrated in FIG. 15, before the convex portions 137 are press-fitted into the shaft hole 138 of the hub wheel 101, the inner peripheral surface of the shaft hole 138 exhibits a simple cylindrical portion 139 having no female spline. Accordingly, when the stem section 130 of the outer joint member 124 is press-fitted into the shaft hole 138 of the hub wheel 101, in order to transfer the convex portions 137 of the stem section 130 onto the inner peripheral surface of the shaft hole 138, a large press-fitting load is needed, and it is necessary to use a pressing machine or the like.

In this context, in a configuration described in Patent Literature 2, as illustrated in FIG. 17, a plurality of convex portions 237 are formed on an outer periphery of a stem section 230 of an outer joint member 224 to extend in an axial direction, and a plurality of small concave portions 239 are formed in advance in a shaft hole 238 of a hub wheel 201 to extend in the axial direction. The plurality of small concave portions 239 have interferences with the convex portions 237. Further, as illustrated in FIG. 18, the stem section 230 of the outer joint member 224 is press-fitted into the shaft hole 238 of the hub wheel 201, thereby forming concave portions 240 onto which profiles of the convex portions 237 are transferred. Thus, there is defined a convex and concave fitting structure in which the convex portions 237 and the concave portions 240 are held in close contact with each other in an entire range of a fitting portion therebetween. As described above, the small concave portions 239 are formed in advance in the shaft hole 238 of the hub wheel 201 so that a load applied when press-fitting the stem section of the outer joint member into the shaft hole of the hub wheel can be reduced as compared to a case of transferring the convex portions 137 onto the simple cylindrical portion 139 as illustrated in FIG. 16. Therefore, when the outer joint member is press-fitted into the hub wheel of the bearing for a wheel, there is no need to separably prepare a dedicated jig. With the screw fastening structure constructed by the bolt 142 and the bolt hole 141 that are components of the bearing device for a wheel, the constant velocity universal joint can be easily coupled to the bearing for a wheel.

CITATION LIST

Patent Literature 1: JP 2009-97557 A
Patent Literature 2: JP 2013-79063 A

SUMMARY OF INVENTION

Technical Problem

In the bearing device for a wheel described in Patent Literature 2, as illustrated in FIG. 17(A), guiding concave portions 265, which are configured to be fitted to the convex portions 237 of the stem section 230 with a gap therebetween, are formed on an inboard side of the small concave portions 239 formed in the shaft hole 238 of the hub wheel 201. Before the convex portions 237 of the stem section 230 are press-fitted into the small concave portions 239 of the hub wheel 201, the convex portions 237 and the guiding concave portions 265 are fitted to each other with a gap therebetween. Thus, press fitting can be performed under a state in which the convex portions 237 and the small concave portions 239 are aligned in phase. At this time, as illustrated in FIG. 17(B), a gap m is defined between each of the convex portions 237 and each of the guiding concave portions 265. Accordingly, as illustrated in FIG. 19, a mouth section 229 of the outer joint member 224 lowers due to a self weight so that a center axis $L_{224}$ of the outer joint member 224 is inclined by an angle θ with respect to a center axis $L_{201}$ of the hub wheel 201. Consequently, an opening portion of a bolt hole 241 of the stem section 230 is arranged at a position radially offset to the center axis $L_{201}$ of the hub wheel 201. At this time, when the inclination angle θ of the outer joint member 224 with respect to the hub wheel 201 is large, a radially offset amount of the opening portion of the bolt hole 241 with respect to the center axis $L_{201}$ of the hub wheel 201 is large, which may cause a fear in that a distal end of a bolt 242 cannot be inserted into the opening portion of the bolt hole 241. In this case, it is necessary to raise the mouth section 229 of the outer joint member 224 to adjust an angle of the outer joint member 224, which reduces workability.

It is an object of the present invention to enhance workability at the time of press-fitting work when assembling a bearing device for a wheel by press-fitting a stem section of a constant velocity universal joint into an inner periphery of a hub wheel by a force of fastening a bolt.

Solution to Problem

As a technical measure to achieve the above-mentioned object, according to one embodiment of the present invention, there is provided a bearing device for a wheel, comprising: a bearing for a wheel comprising: an outer member; an inner member comprising a hub wheel and an inner ring; and double-row rolling elements arranged between double-row outer raceway surfaces formed on an inner periphery of the outer member, and double-row inner raceway surfaces formed on an outer periphery of the inner member; and a constant velocity universal joint comprising: an outer joint member comprising a mouth section and a stem section; an inner joint member accommodated in the mouth section; and a plurality of torque transmitting members arranged between the outer joint member and the inner joint member, the bearing for a wheel and the constant velocity universal joint being connected to each other by threadedly engaging and fastening a bolt, which is inserted from an outboard side through a bolt insertion hole formed in the hub wheel, into a bolt hole formed in an end portion of the stem section on the outboard side, any one of an outer peripheral surface of the stem section and an inner peripheral surface of the hub wheel having convex portions formed therein, which extend in an axial direction, another one of the outer peripheral surface of the stem section and the inner peripheral surface of the hub wheel having concave portions formed therein, which extend in the axial direction, the concave portions being fitted to the convex portions so as to allow torque transmission, any one of the outer peripheral surface of the stem section and the inner peripheral surface of the hub wheel further having a guide portion formed therein, which is configured to guide start of fitting between the convex portions and the concave portions by being fitted to the stem section or the hub wheel with a gap therebetween, wherein under a state in which an entire range of the guide portion is fitted to the stem section or the hub wheel with a gap therebetween before the start of the fitting between the convex portions and the concave portions, a maximum inclination angle of the bolt with respect to the hub wheel is set to be larger than a maximum inclination angle of the outer joint member with respect to the hub wheel.

As described above, in the bearing device for a wheel according to the present invention, under the state in which the entire range of the guide portion is fitted to the stem section or the hub wheel with a gap therebetween before the start of the fitting between the convex portions of the stem section and the concave portions of the hub wheel, a maximum inclination angle $\theta_2$ of the bolt with respect to the hub wheel is set to be larger than a maximum inclination angle $\theta_1$ of the outer joint member with respect to the hub wheel ($\theta_2 > \theta_1$, see FIG. 9). With this, when the bolt is threadedly engaged into the bolt hole of the stem section, a radial movable range of a distal end of the bolt can be wider than a radial range (maximum offset range) in which an opening portion of the bolt hole of the stem section can exist. Therefore, without raising the outer joint member to adjust a position of the opening portion of the bolt hole, a position of the distal end of the bolt and a position of the bolt hole of the stem section can be aligned with each other only by moving the bolt. Thus, the bolt and the bolt hole of the stem section can be easily threadedly engaged with each other.

In the above-mentioned bearing device for a wheel, the plurality of convex portions, which are formed on any one of the hub wheel and the stem section to extend in the axial direction, are press-fitted into another one of the hub wheel and the stem section having formed thereon the plurality of concave portions each having an interference with each of the convex portions. Thus, profiles of the convex portions are transferred onto the another one of the hub wheel and the stem section. In this manner, there is defined a convex and concave fitting structure in which the convex portions and the concave portions are held in close contact with each other in an entire range of a fitting portion therebetween, thereby being capable of firmly coupling the outer joint member and the hub wheel to each other.

In the above-mentioned bearing device for a wheel, the guide portion may comprise a plurality of guiding concave portions formed on a press-fitting start side of small concave portions to extend in the axial direction.

In the above-mentioned bearing device for a wheel, each of the small concave portions has an interference only with each circumferential side wall portion of each of the convex portions, and only a profile of the circumferential side wall portion of each of the convex portions is transferred onto each of the small concave portions. In this manner, the convex and concave fitting structure is defined, in which the convex portions and the concave portions are held in close contact with each other in the entire range of the fitting portion. Consequently, a press-fitting load can be reduced, thereby being capable of further enhancing the workability at the time of mounting.

Advantageous Effects of Invention

As described above, in the bearing device for a wheel according to the present invention, without adjusting a position of the outer joint member, the distal end of the bolt can be threadedly engaged into the bolt hole of the stem section. Accordingly, the press-fitting work is facilitated, and the workability is enhanced.

DESCRIPTION OF EMBODIMENTS

Figure 1:
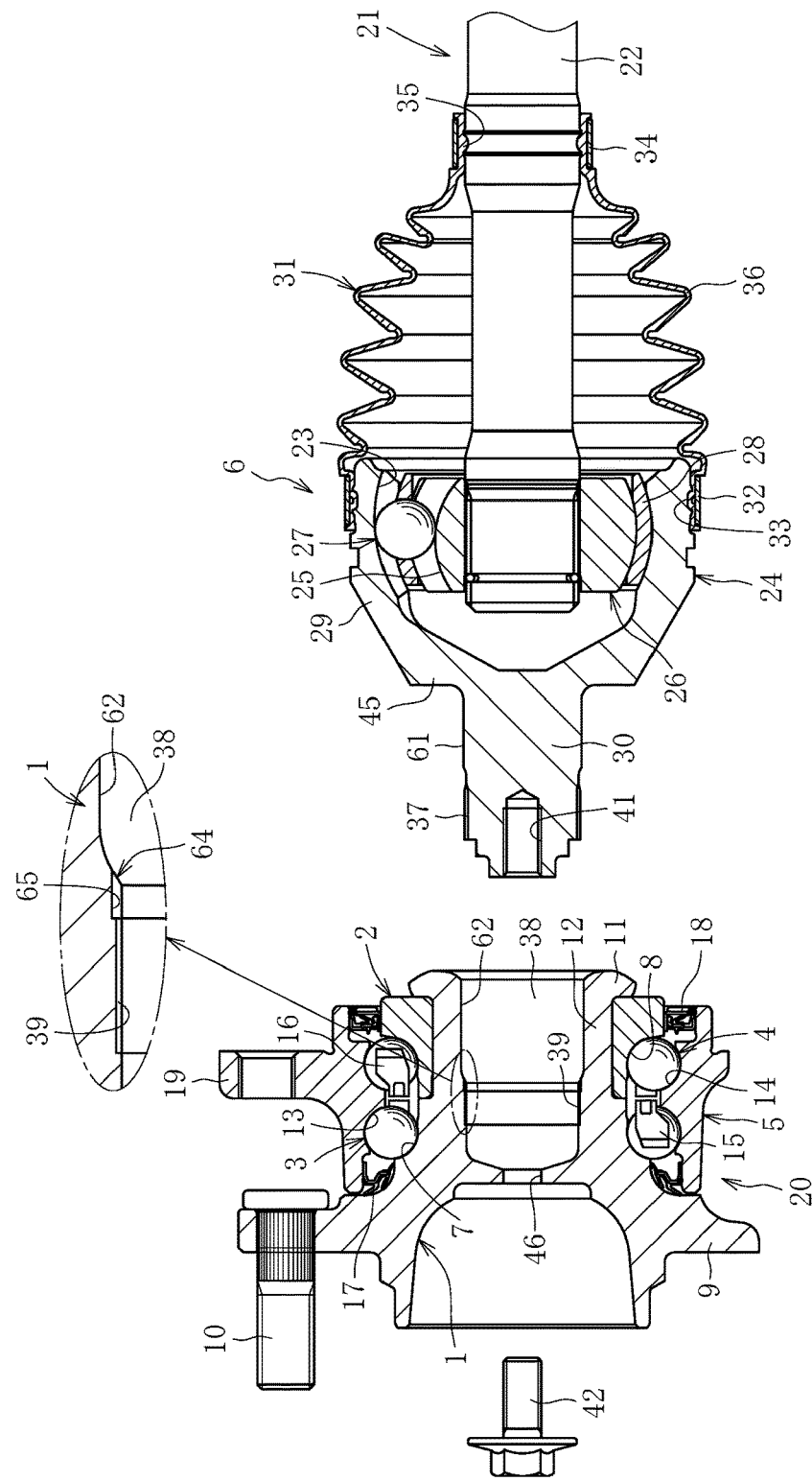
FIG. 1 is a vertical sectional view for illustrating a state before mounting a constant velocity universal joint to a bearing for a wheel having a staking structure in a bearing device for a wheel (third generation) according to an embodiment of the present invention.
Figure 2:
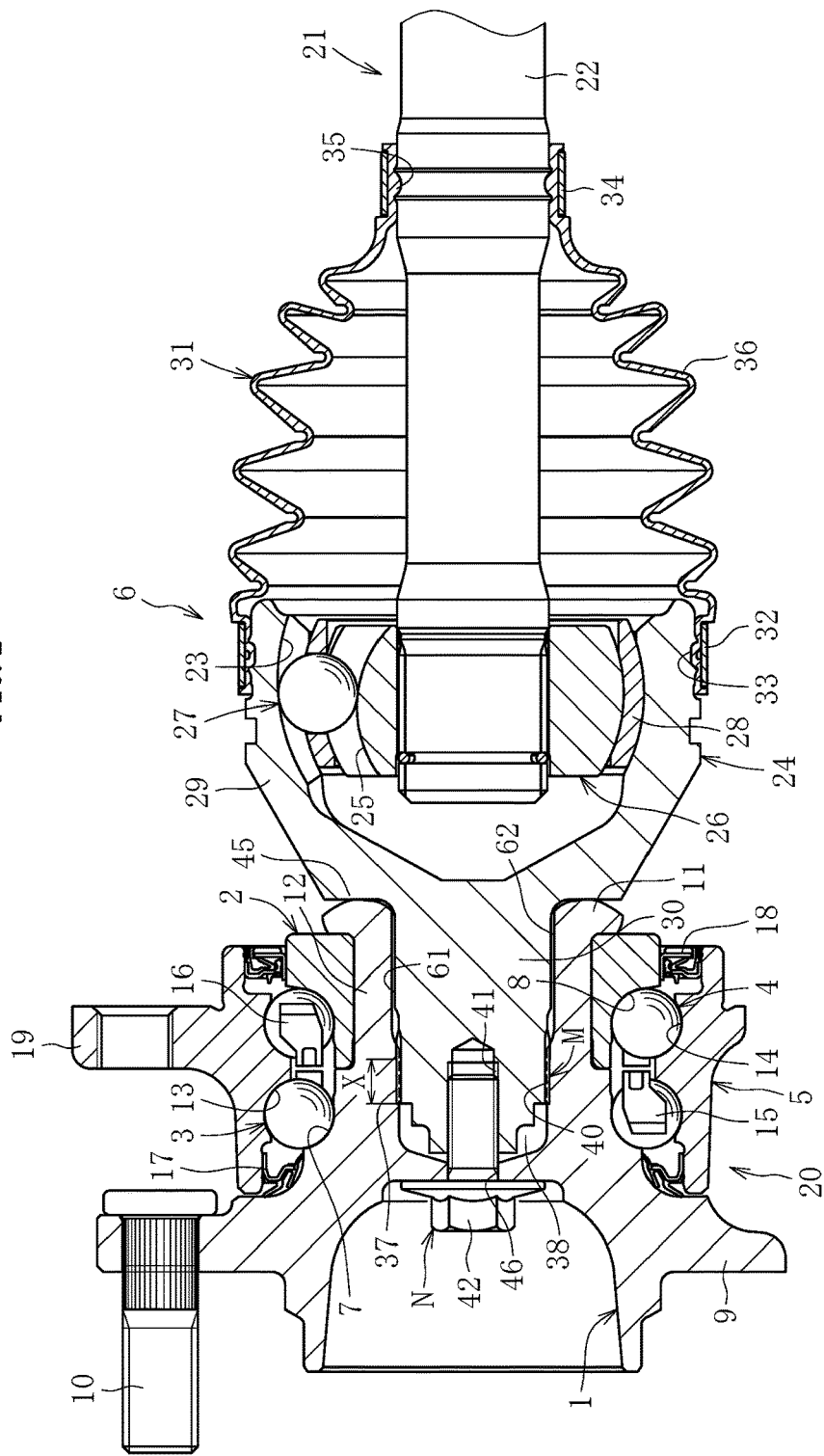
FIG. 2 is a vertical sectional view for illustrating a state after mounting the constant velocity universal joint to the bearing for a wheel of FIG. 1.

Now, a bearing device for a wheel according to embodiments of the present invention is described in detail. A bearing device for a wheel illustrated in FIG. 1 and FIG. 2 comprises, as main components thereof, a constant velocity universal joint 6, and a bearing 20 for a wheel comprising a hub wheel 1 and an inner ring 2 that serve as an inner member, double-row rolling elements 3 and 4, and an outer ring 5. FIG. 1 is an illustration of a state before mounting the constant velocity universal joint 6 to the bearing 20 for a wheel, and FIG. 2 is an illustration of a state after mounting the constant velocity universal joint 6 to the bearing 20 for a wheel. Note that, in the following description, an outer side of a vehicle body in a state in which the bearing device for a wheel is mounted to the vehicle body is referred to as "outboard side" (left side of the figures), and a middle side of the vehicle body is referred to as "inboard side" (right side of the figures).

The hub wheel 1 has an inner raceway surface 7 on the outboard side formed on an outer peripheral surface thereof, and comprises a wheel mounting flange 9 configured to allow a wheel (not shown) to be mounted thereto. Hub bolts 10 configured to fix a wheel disc are equiangularly embedded in the wheel mounting flange 9. The inner ring 2 is fitted to a small-diameter step portion 12 formed on an outer peripheral surface of the hub wheel 1 on the inboard side, and an inner raceway surface 8 on the inboard side is formed on an outer peripheral surface of the inner ring 2.

The inner ring 2 is press-fitted with an adequate interference for the purpose of preventing creep. The inner raceway surface 7 on the outboard side that is formed on the outer peripheral surface of the hub wheel 1 and the inner raceway surface 8 on the inboard side that is formed on the outer peripheral surface of the inner ring 2 correspond to double-row raceway surfaces. The inner ring 2 is press-fitted to the small-diameter step portion 12 of the hub wheel 1, and the end portion of the small-diameter step portion 12 is staked outward by orbital forming. As a result, the inner ring 2 is retained by a staked portion 11 thus formed and integrated with the hub wheel 1, to thereby apply a preload to the bearing 20 for a wheel.

Figure 3:
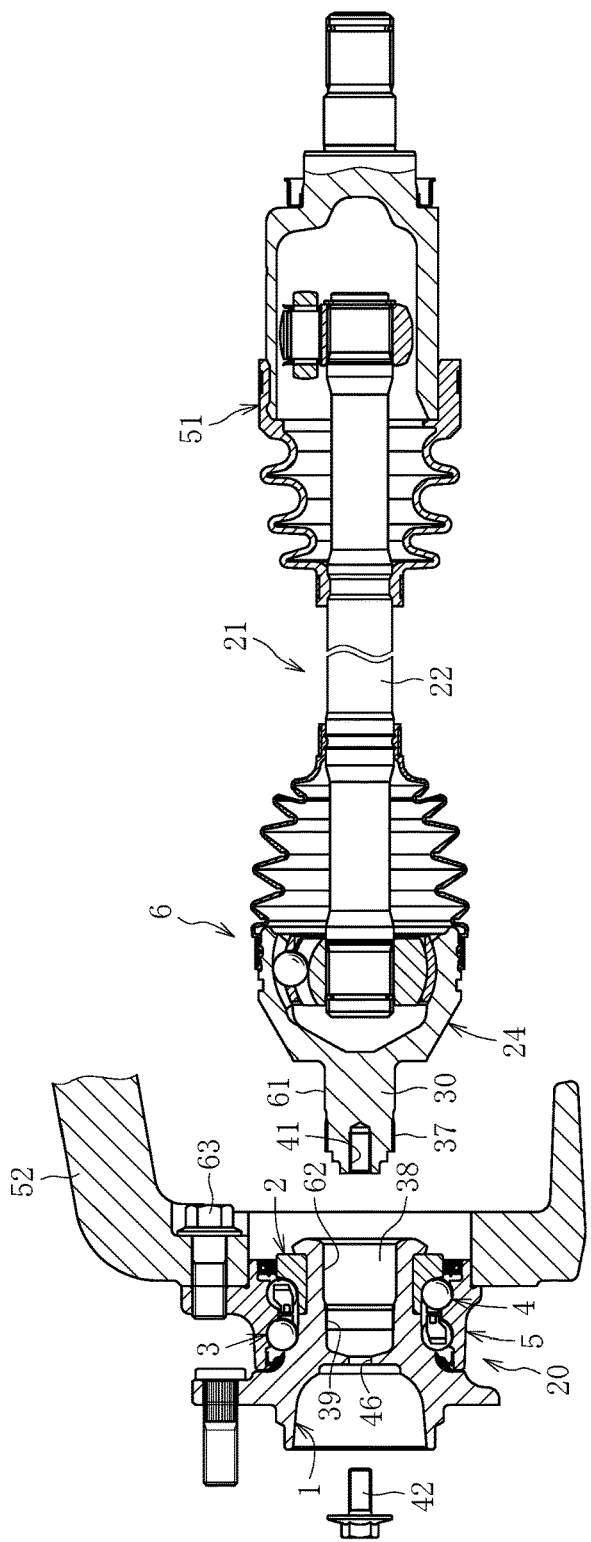
FIG. 3 is a sectional view for illustrating a state before mounting the constant velocity universal joint of a drive shaft to the bearing for a wheel, which is mounted to a knuckle.

The outer ring 5 has double-row outer raceway surfaces 13 and 14 formed on an inner peripheral surface thereof so as to be opposed to the raceway surfaces 7 and 8 of the hub wheel 1 and the inner ring 2, and comprises a vehicle body mounting flange 19 configured to allow the bearing device for a wheel to be mounted to a knuckle extending from a suspension device of a vehicle body (not shown). As described later, the vehicle body mounting flange 19 is fitted to the above-mentioned knuckle 52, and is fixed thereto with bolts 63 (see FIG. 3).

The bearing 20 for a wheel has a double-row angular contact ball bearing structure. Specifically, the rolling elements 3 and 4 are interposed between the inner raceway surfaces 7 and 8 formed on the outer peripheral surfaces of the hub wheel 1 and the inner ring 2 and the outer raceway surfaces 13 and 14 formed on the inner peripheral surface of the outer ring 5, and the rolling elements 3 and 4 in the respective rows are equiangularly supported by retainers 15 and 16.

In opening portions of the bearing 20 for a wheel at both ends thereof, a pair of seals 17 and 18 configured to seal annular spaces between the outer ring 5 and the hub wheel 1 and between the outer ring 5 and the inner ring 2 is fitted to a radially inner part of the outer ring 5 at both end portions thereof. The seals 17 and 18 prevent leakage of grease filled inside and entry of water and foreign matter from the outside.

The constant velocity universal joint 6 comprises an outer joint member 24 being arranged at one end of an intermediate shaft 22 forming a drive shaft 21 and having track grooves 23 formed in an inner peripheral surface thereof, an inner joint member 26 having track grooves 25 formed in an outer peripheral surface thereof so as to be opposed to the track grooves 23 of the outer joint member 24, balls 27 serving as torque transmission members assembled into spaces between the track grooves 23 of the outer joint member 24 and the track grooves 25 of the inner joint member 26, and a cage 28 interposed between the inner peripheral surface of the outer joint member 24 and the outer peripheral surface of the inner joint member 26 so as to retain the balls 27.

The outer joint member 24 comprises a mouth section 29 configured to accommodate internal components such as the inner joint member 26, the balls 27, and the cage 28, and a stem section 30 integrally extending from the mouth section 29 in an axial direction. An axial end of the intermediate shaft 22 is press-fitted to the inner joint member 26, and is coupled by spline fitting so as to allow torque transmission therebetween.

A bellows boot 31 made of a resin is mounted between the outer joint member 24 of the constant velocity universal joint 6 and the intermediate shaft 22, and an opening portion of the outer joint member 24 is closed by the boot 31. With this structure, leakage of a lubricant such as grease sealed inside the joint is prevented, and entry of foreign matter from the outside of the joint is prevented. The boot 31 comprises a large-diameter end portion 33 fixed to an outer peripheral surface of the outer joint member 24 by fastening with a boot band 32, a small-diameter end portion 35 fixed to an outer peripheral surface of the intermediate shaft 22 by fastening with a boot band 34, and a flexible bellows portion 36 connecting the large-diameter end portion 33 and the small-diameter end portion 35 and being reduced in diameter in a range of from the large-diameter end portion 33 toward the small-diameter end portion 35.

A columnar fitting surface 61 is formed on an outer peripheral surface of the stem section 30 of the outer joint member 24 on the inboard side, and a male spline comprising a plurality of convex portions 37 extending in the axial direction is formed on an outer peripheral surface of the stem section 30 on the outboard side. In contrast, a cylindrical fitting surface 62 is formed on an inner peripheral surface of a shaft hole 38 of the hub wheel 1 on the inboard side, and a female spline comprising a plurality of small concave portions 39 extending in the axial direction is formed in an inner peripheral surface of the shaft hole 38 on the outboard side. Each of the small concave portions 39 has an interference n only with each circumferential side wall portion 43 of each of the convex portions 37 of the stem section 30 {see FIG. 7(B)}. Note that, in the illustrated example, the convex portions 37 are formed into a tooth profile with a trapezoidal cross section, but may be formed into an involute tooth profile.

In this bearing device for a wheel, the stem section 30 of the outer joint member 24 is press-fitted into the shaft hole 38 of the hub wheel 1, and the shapes of only the circumferential side wall portions 43 of the corresponding convex portions 37 are transferred to the small concave portions 39 of the shaft hole 38 of the hub wheel 1, to thereby form concave portions 40. In this manner, there is defined a convex and concave fitting structure M in which the convex portions 37 and the concave portions 40 are held in close contact with each other in an entire range of a fitting portion X therebetween (see FIG. 2). That is, both the circumferential side wall portions 43 of all of the convex portions 37 and inner walls of the concave portions 40 are held in close contact with each other in an entire axial range of the fitting portion X. Note that, as a material for the outer joint member 24 and the hub wheel 1, medium carbon steel for machine structural use, which is typified by S53C and the like, is preferably employed.

Figure 6A:
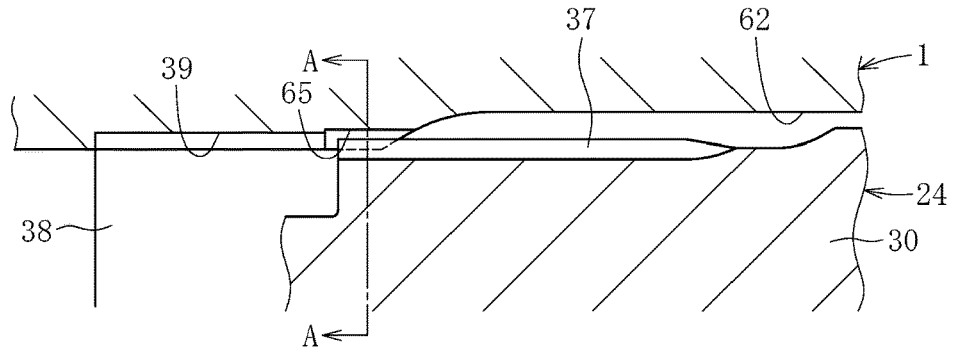
FIG. 6(A) is an enlarged main part sectional view for illustrating a state before press-fitting a stem section of an outer joint member into a hub wheel of the bearing for a wheel.
Figure 6B:
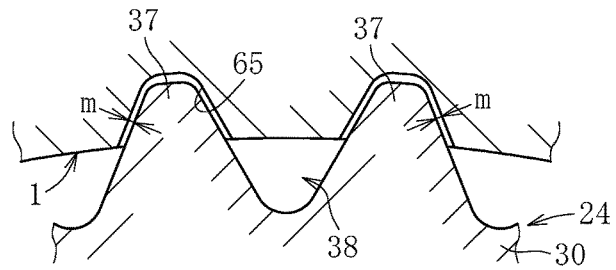
FIG. 6(B) is a sectional view taken along the line A-A of FIG. 6(A).

As illustrated in FIG. 6(A) and FIG. 6(B), a guide portion configured to guide start of press fitting (fitting) between the convex portions 37 and the concave portions 40 is formed between the fitting surface 62 positioned on the inboard side of the hub wheel 1 and the small concave portions 39 positioned on the outboard side thereof. In this embodiment, guiding concave portions 65 are formed as the guide portion. Each of the guiding concave portions 65 is formed to be larger than each of the convex portions 37 of the stem section 30 in cross section orthogonal to an axis of the hub wheel. Each of the guiding concave portions 65 is formed on an extension line of each of the small concave portions 39 to be adjacent to each of the small concave portions 39. An axial length of each of the guiding concave portions 65 is smaller than an axial length of each of the small concave portions 39, and is set to, for example, from 5 mm to 8 mm. The guiding concave portions 65 are slightly larger than the small concave portions 39 in size. In particular, a circumferential dimension of each of the guiding concave portions 65 is larger than a circumferential dimension of each of the small concave portions 39. Thus, a gap m is defined between each of the convex portions 37 and each of the guiding concave portions 65.

This bearing device for a wheel comprises the following screw fastening structure N (see FIG. 2). This screw fastening structure N comprises a bolt hole 41 serving as a female thread portion formed at an axial end of the stem section 30 of the outer joint member 24, and a bolt 42 serving as a male thread portion to be locked on the hub wheel 1 in a state of being threadedly engaged with the bolt hole 41. In this structure, the bolt 42 is inserted through a bolt insertion hole 46 of the hub wheel 1 from the outboard side, and a distal end of the bolt 42 is threadedly engaged and fastened into the bolt hole 41 of the stem section 30. In this manner, the constant velocity universal joint 6 is fixed to the hub wheel 1. Note that, the bearing 20 for a wheel is structured to be integrated with the hub wheel 1 in such a manner that the staked portion 11 prevents the inner ring 2 from slipping off. The bearing 20 for a wheel is separable from the outer joint member 24 of the constant velocity universal joint 6 through removal of the bolt 42 from the bolt hole 41.

The fixed type constant velocity universal joint 6 corresponds to a part of the drive shaft 21 configured to transmit power from an engine of an automobile to a wheel thereof. It is necessary that the drive shaft 21 be adaptable to angular displacement and axial displacement caused by a change in relative positional relationship between the engine and the wheel. Therefore, as in the structure illustrated in FIG. 3, a plunging type constant velocity universal joint 51 and the fixed type constant velocity universal joint 6 are generally installed on the engine side (inboard side) and the wheel side (outboard side), respectively, and both the constant velocity universal joints 6 and 51 are coupled to each other through intermediation of the intermediate shaft 22.

Now, description is made of a method of mounting the drive shaft 21 comprising the constant velocity universal joint 6 to the bearing 20 for a wheel fixed to the knuckle 52.

Figure 4:
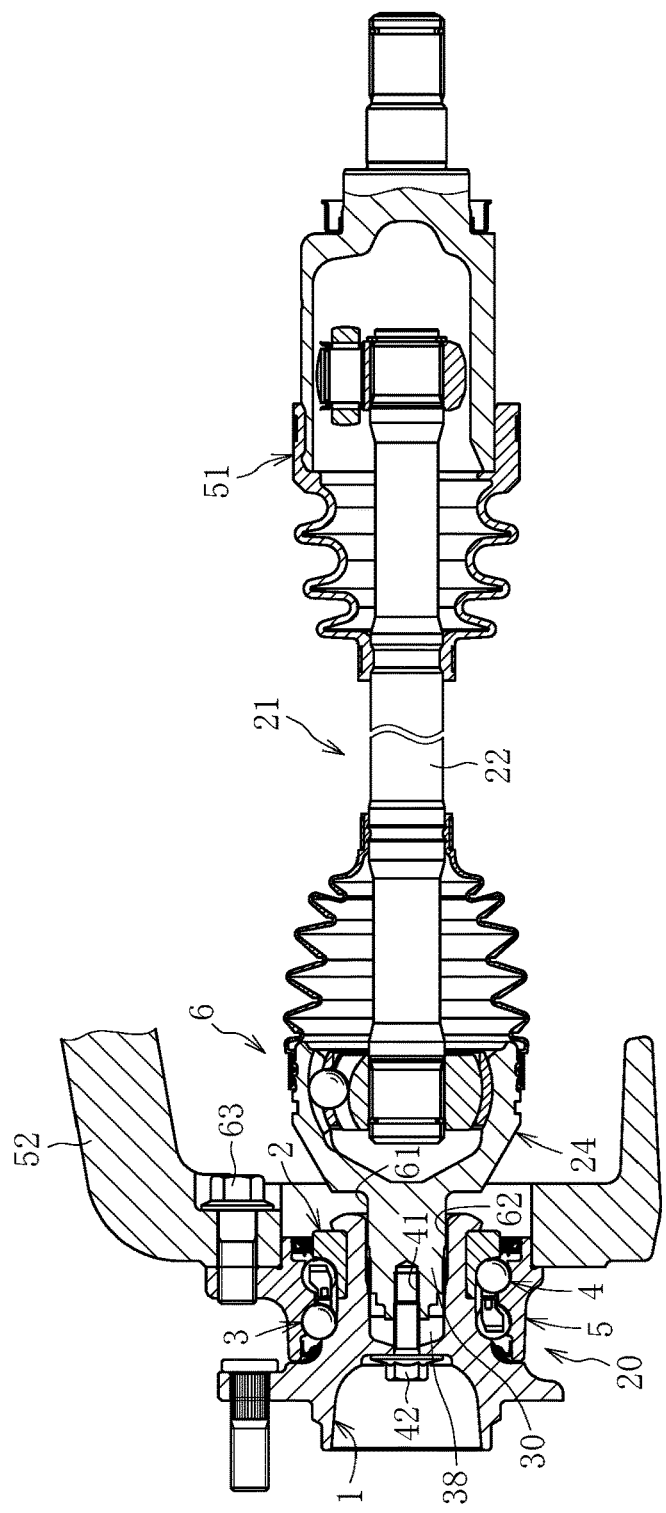
FIG. 4 is a sectional view for illustrating a state in the middle of mounting the constant velocity universal joint of the drive shaft to the bearing for a wheel, which is mounted to the knuckle.

First, from the inboard side, the drive shaft 21 is brought close to the bearing 20 for a wheel fixed to the knuckle 52 (see FIG. 3), and the stem section 30 of the outer joint member 24 of the constant velocity universal joint 6 is inserted into the shaft hole 38 of the hub wheel 1 from the inboard side (see FIG. 4). At this time, before the stem section 30 of the outer joint member 24 is press-fitted into the shaft hole 38 of the hub wheel 1, the cylindrical fitting surface 61 of the stem section 30 is fitted onto the cylindrical fitting surface 62 of the shaft hole 38 of the hub wheel 1, thereby being capable of easily aligning an axis of the stem section 30 with an axis of the hub wheel 1.

After that, the stem section 30 of the outer joint member 24 is further inserted into the shaft hole 38 of the hub wheel 1, and the guiding concave portions 65 formed in an inner periphery of the hub wheel 1 and the convex portions 37 formed on an outer periphery of the stem section 30 are fitted to each other (see FIG. 6). In this manner, before the stem section 30 of the outer joint member 24 is press-fitted into the hub wheel 1, the convex portions 37 of the stem section 30 and the small concave portions 39 of the hub wheel 1 can be aligned in phase. Accordingly, press fitting can be performed stably, thereby being capable of preventing misalignment of axes, inclination of axes, and the like at the time of press fitting.

At this time, the gap m is defined between each of the convex portions 37 and each of the guiding concave portions 65. Accordingly, under a state immediately before the stem section 30 is press-fitted into the hub wheel 1, that is, under a state in which the convex portions 37 of the stem section 30 are inserted up to end portions of the guiding concave portions 65 on the outboard side, the outer joint member 24 is inclined with respect to the hub wheel 1 due to a self weight so that a center axis $L_{24}$ of the outer joint member 24 is inclined with respect to a center axis $L_1$ of the hub wheel 1 (see FIG. 9). Consequently, a center of the opening portion of the bolt hole 41 of the stem section 30 is arranged to be radially offset to the center axis $L_1$ of the hub wheel 1. Thus, under a state in which the bolt 42 is inserted into the bolt insertion hole 46 of the hub wheel 1 from the outboard side, the distal end of the bolt 42 and the opening portion of the bolt hole 41 of the stem section 30 cannot be aligned with each other, which may cause a fear in that the bolt 42 and the bolt hole 41 cannot be threadedly engaged with each other.

Figure 9:
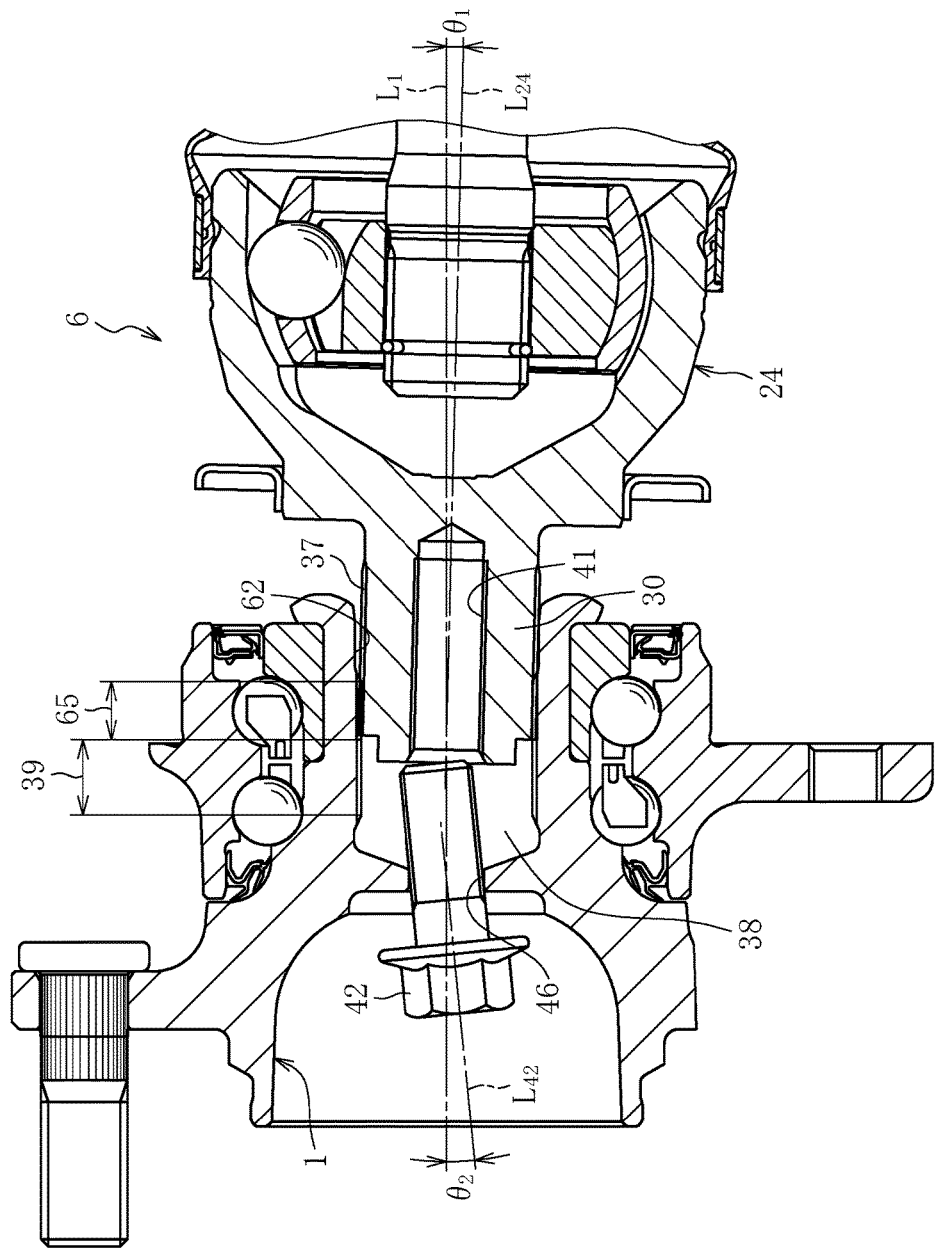
FIG. 9 is a sectional view for illustrating a state immediately before press-fitting the stem section of the outer joint member of the constant velocity universal joint of FIG. 1 into a shaft hole of the hub wheel.

In this embodiment, the hub wheel 1, the outer joint member 24, and the bolt 42 are designed so that a maximum inclination angle $\theta_2$ of the bolt 42 inserted through the bolt insertion hole 46 of the hub wheel 1 is larger than a maximum inclination angle $\theta_1$ formed between the center axis $L_{24}$ of the outer joint member 24 and the center axis $L_1$ of the hub wheel 1 under the state illustrated in FIG. 9, that is, under a state in which the convex portions 37 and an entire axial range of the guiding concave portions 65 are fitted to each other with a gap therebetween before the convex portions 37 of the stem section 30 and the concave portions 40 of the hub wheel 1 are fitted to each other (before the convex portions 37 are press-fitted into the small concave portions 39). The maximum inclination angle $\theta_1$ of the outer joint member 24 with respect to the hub wheel 1 is determined depending on a cross-sectional shape and the axial length of each of the guiding concave portions 65 of the hub wheel 1, a cross-sectional shape of each of the convex portions 37 of the stem section 30, and a size of the gap m defined between each of the guiding concave portions 65 and each of the convex portions 37. The maximum inclination angle $\theta_2$ of the bolt 42 with respect to the hub wheel 1 is determined depending on an outer diameter of the bolt 42 (outer diameter of a threaded portion in the illustrated example), and an inner diameter and an axial length of the bolt insertion hole 46 of the hub wheel 1. As described above, the maximum inclination angle $\theta_2$ of the bolt 42 is set to be larger than the maximum inclination angle $\theta_1$ of the outer joint member 24, thereby being capable of setting a maximum radial movement amount of the distal end of the bolt 42 to be larger than a maximum offset amount of the opening portion of the bolt hole 41 of the stem section 30. More specifically, at least radial movement of the distal end of the bolt 42 is allowed so as to enable a chamfered portion formed on an outer periphery of the distal end of the bolt 42 to be brought into abutment on a chamfered portion formed on an inner periphery of the opening portion of the bolt hole 41. With this, the distal end of the bolt 42 can be fitted to the opening portion of the bolt hole 41 by being moved in a radial direction. Thus, work of raising the outer joint member 24 to adjust an inclination angle of the stem section 30 is unnecessary, which enhances workability.

Further, in the illustrated example, the bolt 42 is fitted into the bolt insertion hole 46 of the hub wheel 1 so that the bolt 42 is centered on the hub wheel 1 to some extent. At this time, when the maximum inclination angle of the bolt 42 with respect to the hub wheel 1 is set to a predetermined angle or less, the distal end of the bolt 42 and the opening portion of the bolt hole 41 of the stem section 30 are easily aligned with each other. Specifically, for example, even when the bolt 42 is inclined under a state in which the bolt 42 is fitted into the bolt insertion hole 46, the distal end of the bolt 42 is not brought into abutment on the inner peripheral surface of the shaft hole 38 of the hub wheel 1. In this embodiment, under the state illustrated in FIG. 9, the maximum inclination angle $\theta_2$ of the bolt 42 with respect to the hub wheel 1 is set to 10° or less.

After that, the bolt 42 is threadedly engaged and fastened into the bolt hole 41. In this manner, the stem section 30 of the outer joint member 24 is further inserted into the shaft hole 38 of the hub wheel 1, and the convex portions 37 formed on the outer periphery of the stem section 30 are press-fitted into the small concave portions 39 formed in the inner periphery of the hub wheel 1 (see FIG. 7). At this time, as illustrated in FIG. 7(B), the circumferential dimension of each of the small concave portions 39 of the hub wheel 1 is set to be smaller than a circumferential dimension of each of the convex portions 37 of the stem section 30, and each of the small concave portions 39 has the interference n only with each circumferential side wall portion 43 of each of the convex portions 37. On the other hand, a portion of each of the convex portions 37 excluding the circumferential side wall portions 43, namely, a radial distal end portion 44 of each of the convex portions 37 has no interference with each of the small concave portions 39. That is, a radial dimension of each of the small concave portions 39 is set to be larger than a radial dimension of each of the convex portions 37. With this, a gap p is defined between a bottom portion of each of the small concave portions 39 and the radial distal end portion 44 of each of the convex portions 37. At this time, the radial distal end portion 44 of each of the convex portions 37 has no interference with each of the small concave portions 39. Accordingly, a profile of the radial distal end portion 44 of each of the convex portions 37 is not transferred onto each of the small concave portions 39.

At this time, surface hardness of the convex portions 37 is set to be higher than surface hardness of the small concave portions 39. Specifically, a difference between the surface hardness of the convex portions 37 and the surface hardness of the small concave portions 39 is 20 or more in terms of HRC. Thus, the profile of each circumferential side wall portion 43 of each of the convex portions 37 can be easily transferred onto a concave portion forming surface by plastic deformation and cutting work accompanied at the time of press fitting. Note that, it is preferred that the surface hardness of the convex portions 37 be from 50 to 65 in terms of HRC, and that the surface hardness of the small concave portions 39 be from 10 to 30 in terms of HRC.

Figure 7A:
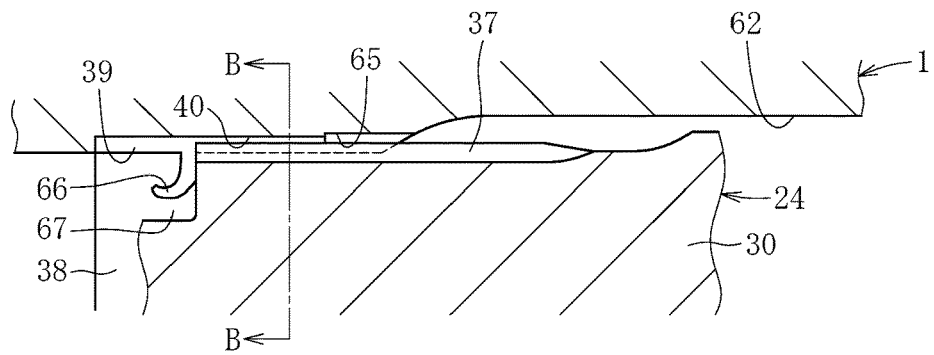
FIG. 7(A) is an enlarged main part sectional view for illustrating a state in the middle of press-fitting the stem section of the outer joint member into the hub wheel of the bearing for a wheel.
Figure 7B:
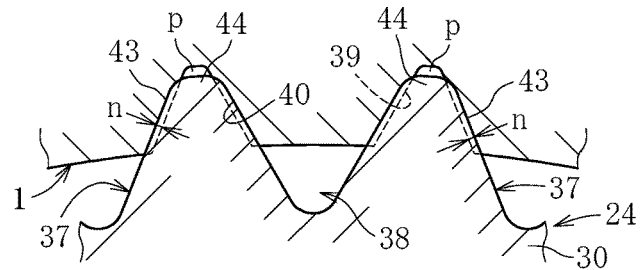
FIG. 7(B) is a sectional view taken along the line B-B of FIG. 7(A).
Figure 8A:
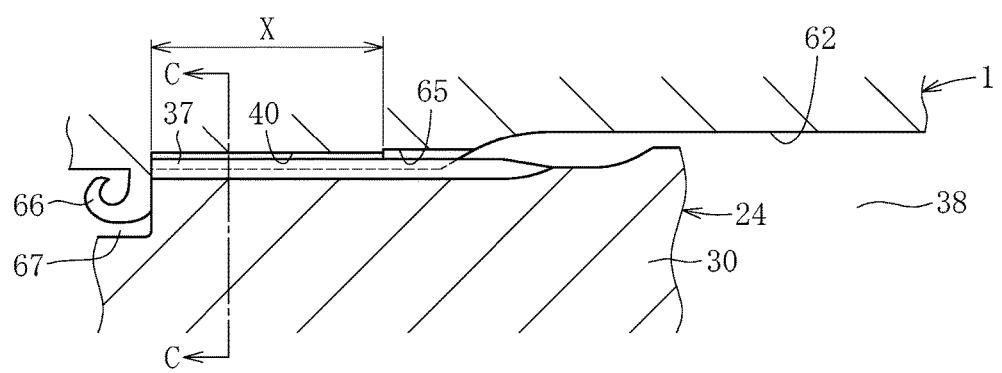
FIG. 8(A) is an enlarged main part sectional view for illustrating a state after press-fitting the stem section of the outer joint member into the hub wheel of the bearing for a wheel.

Further, between the shaft hole 38 of the hub wheel 1 and the stem section 30 of the outer joint member 24, there is defined a receiving portion 67 configured to receive a flash portion 66 that is generated by transferring the profile of each of the convex portions through press fitting {see FIG. 7(A) and FIG. 8(A)}. With this, the flash portion 66 generated by transferring the profile of each of the convex portions through press fitting can be kept in the receiving portion 67, thereby being capable of preventing the entry of the flash portion 66 into a vehicle or the like outside of the device. The flash portion 66 is kept in the receiving portion 67 so that a process of removing the flash portion 66 is unnecessary. Thus, man-hours of work can be reduced, and enhancement of workability and cost reduction can be achieved.

Figure 15:
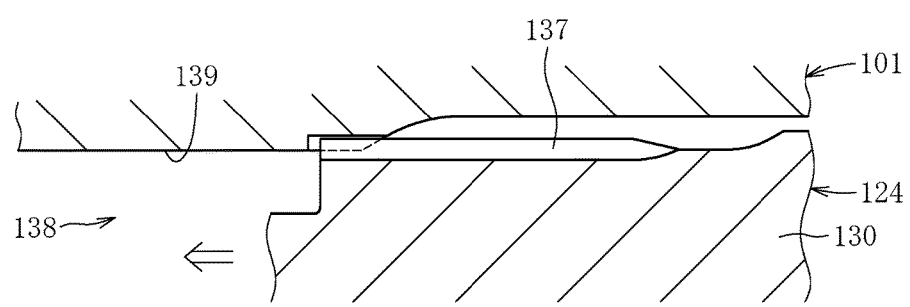
FIG. 15 is an enlarged main part vertical sectional view of the bearing device for a wheel of FIG. 14, for illustrating a state before press-fitting a stem section of an outer joint member into a shaft hole of a hub wheel.
Figure 16:
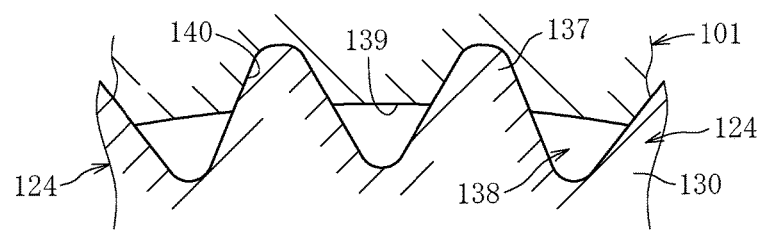
FIG. 16 is an enlarged main part transverse sectional view of the bearing device for a wheel of FIG. 14, for illustrating a state after press-fitting the stem section of the outer joint member into the shaft hole of the hub wheel.
Figure 17A:
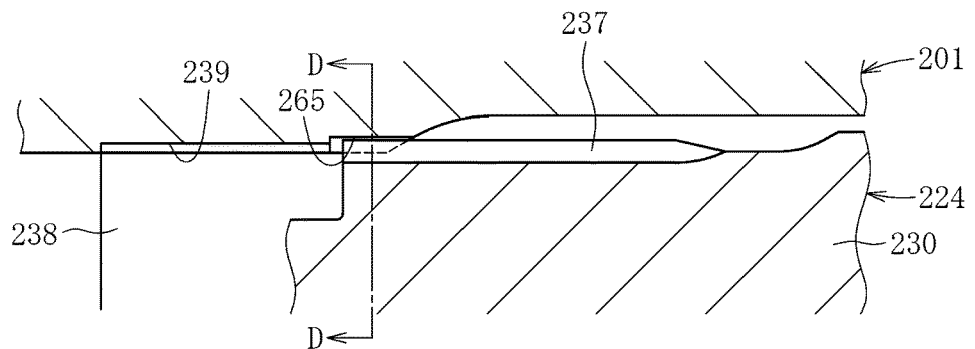
FIG. 17(A) is a sectional view for illustrating a state before press-fitting a stem section of another related-art bearing device for a wheel into a hub wheel.
Figure 17B:
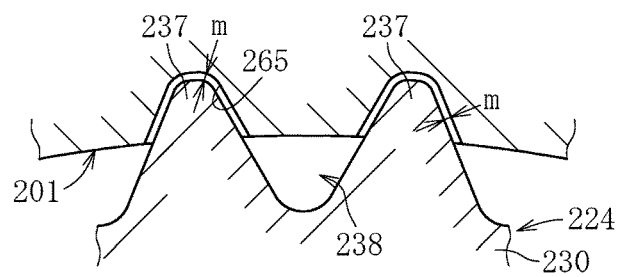
FIG. 17(B) is a sectional view taken along the line D-D of FIG. 17(A).
Figure 18A:
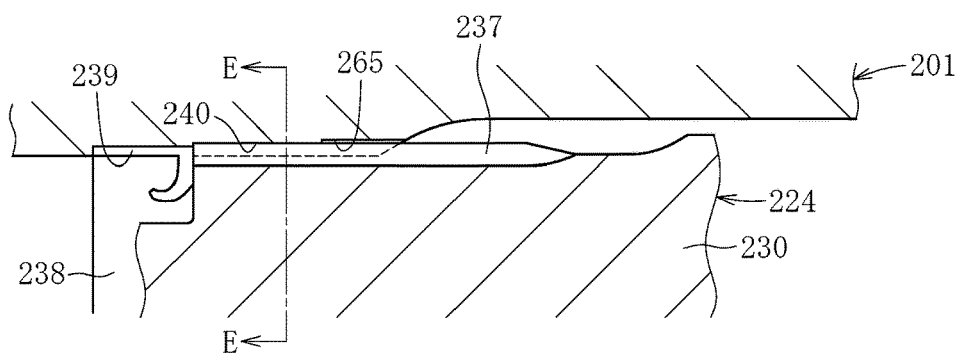
FIG. 18(A) is a sectional view for illustrating a state in the middle of press-fitting the stem section of the bearing device for a wheel of FIG. 17 into the hub wheel.
Figure 18B:
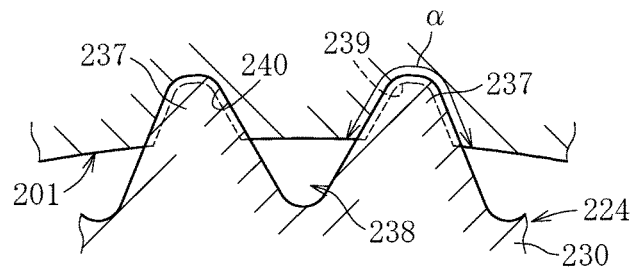
FIG. 18(B) is a sectional view taken along the line E-E of FIG. 18(A).
Figure 19:
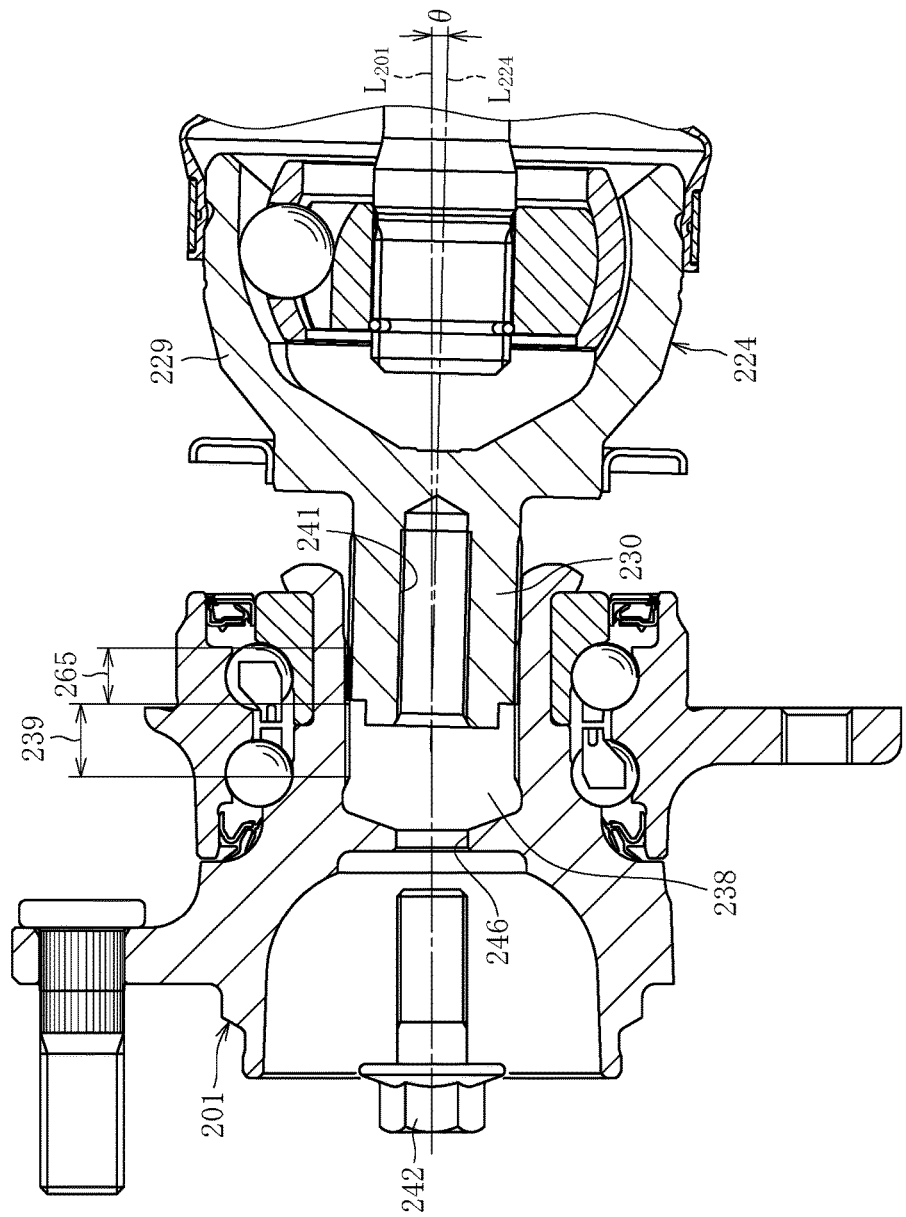
FIG. 19 is a vertical sectional view of an entire configuration of the bearing device for a wheel of FIG. 17, for illustrating a state immediately before press-fitting the stem section into the hub wheel.

The small concave portions 39 are formed in advance for the convex portions 37. Accordingly, when the stem section 30 is press-fitted into the hub wheel 1 as described above, a press-fitting load can be reduced as compared to a case of transferring the convex portions 137 onto the cylindrical portion 139 as illustrated in FIG. 15. In addition, only the profile of each circumferential side wall portion 43 of each of the convex portions 37 is transferred so that the press-fitting load can be reduced as compared to a case where the profile to be transferred includes a radial distal end portion of each of the convex portions 237 as illustrated in FIG. 18, that is, a case where an interference is set in a range a from a mid-slope of a mountain profile to a peak of the mountain profile of each of the convex portions 237.

Figure 5:
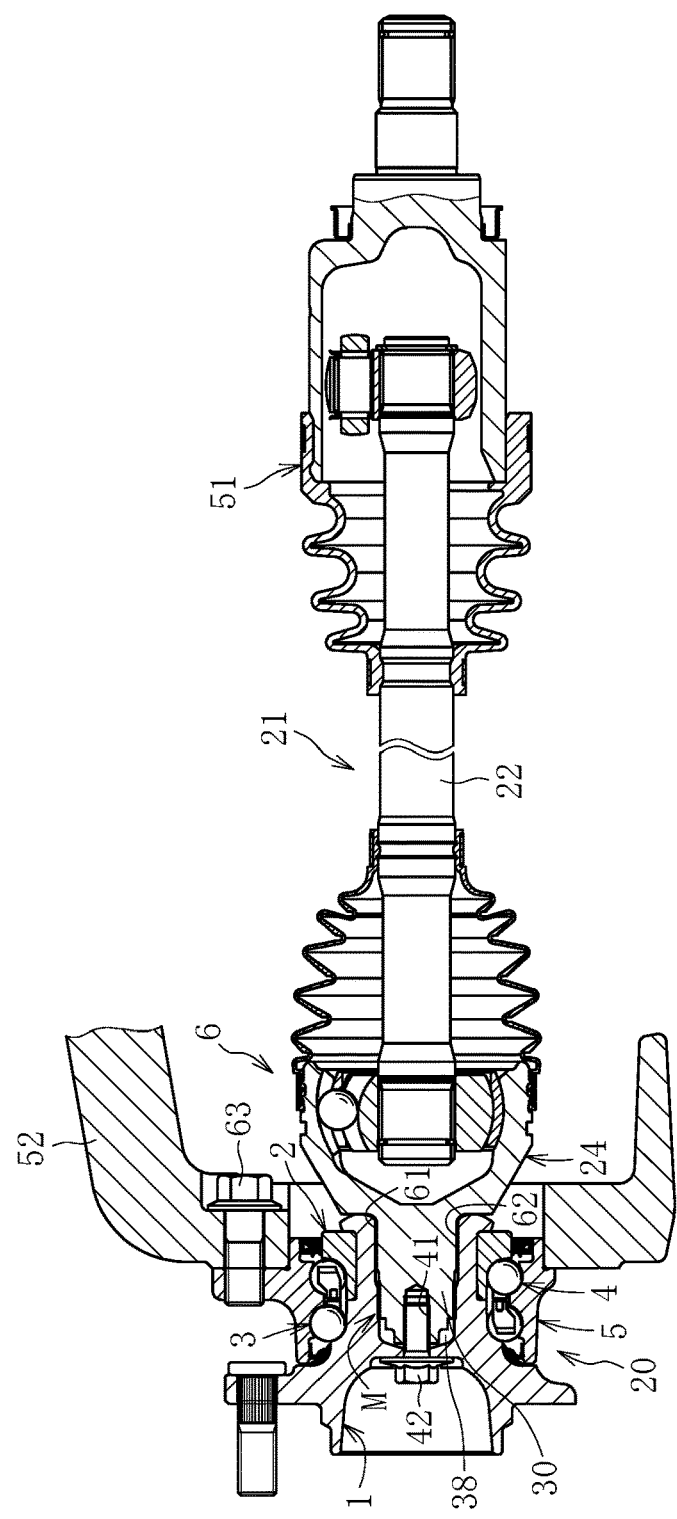
FIG. 5 is a sectional view for illustrating a state after mounting the constant velocity universal joint of the drive shaft to the bearing for a wheel, which is mounted to the knuckle.

As a result, as illustrated in FIG. 5, the outer joint member 24 can be press-fitted into the hub wheel 1 with an axial force generated by fastening the bolt 42. That is, after the bearing 20 for a wheel is mounted to the knuckle 52 of the vehicle body, the outer joint member 24 can easily be press-fitted into the hub wheel 1 of the bearing 20 for a wheel with a pull-in force generated by the bolt 42, with the result that the constant velocity universal joint 6 can easily be coupled to the bearing 20 for a wheel. Thus, the workability can be enhanced when mounting the bearing 20 for a wheel to the vehicle body, and the damage to the components can be forestalled at the time of mounting the bearing 20 for a wheel.

As described above, there is no need to separately prepare a dedicated jig when press-fitting the outer joint member 24 to the hub wheel 1 of the bearing 20 for a wheel after the bearing 20 for a wheel is mounted to the knuckle 52 of the vehicle body. Instead, the constant velocity universal joint 6 can be coupled, in a simple way, to the bearing 20 for a wheel with the bolt 42 that is a component of the bearing device for a wheel. Further, the outer joint member 24 can be press-fitted by applying the relatively small pull-in force, which is equal to or smaller than the axial force generated by fastening the bolt 42, and hence the workability can be enhanced when pulling in the outer joint member 24 with the bolt 42. Still further, there is no need to apply a significant press-fitting load, and hence the damage to (collapse of) the convex and concave portions can be prevented in the convex and concave fitting structure M, with the result that a high-quality and long-life convex and concave fitting structure M can be realized.

Figure 8B:
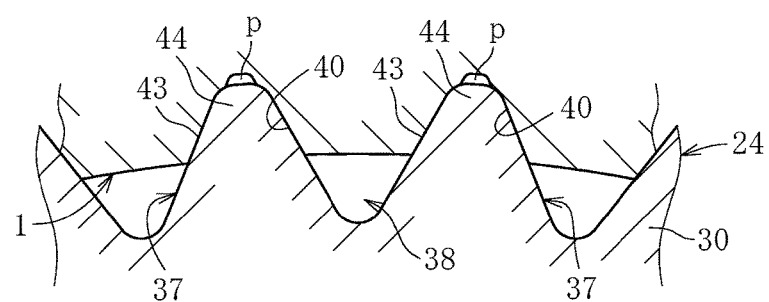
FIG. 8(B) is a sectional view taken along the line C-C of FIG. 8(A).

By press-fitting the stem section 30 of the outer joint member 24 into the shaft hole 38 of the hub wheel 1 as described above, the surface on which the concave portion is formed (inner surface of the small concave portion 39) is plastically deformed and cut by an extremely small amount due to the circumferential side wall portions 43 of each convex portion 37, to thereby transfer the shapes of the circumferential side wall portions 43 of the convex portion 37 to the surface on which the concave portion is formed. At this time, the circumferential side wall portions 43 of the convex portion 37 dig into the surface on which the concave portion is formed, thereby leading to a state in which the inner diameter of the hub wheel 1 is slightly increased. Thus, relative movement of the convex portion 37 in the axial direction is allowed. When the relative movement of the convex portion 37 in the axial direction is stopped, the inner diameter of the hub wheel 1 is reduced so as to recover the original diameter. Consequently, the concave portions 40 that are held in close contact with the convex portions 37 in the entire range of the fitting portion X therebetween are formed, with the result that the outer joint member 24 and the hub wheel 1 can firmly be coupled to each other (see FIG. 5 and FIG. 8).

Through the coupling thus carried out at low cost with high reliability, any gap that may cause a backlash is not formed in the radial direction and the circumferential direction of the fitting portion between the stem section 30 and the hub wheel 1, and hence the entire range of the fitting portion X between the convex portions 37 and the concave portions 40 contributes to rotational torque transmission, thereby being capable of achieving stable torque transmission. As a result, annoying gear rattling noise can be prevented over a long period of time. The convex portions 37 and the concave portions 40 are thus brought into close contact with each other in the entire range of the fitting portion X therebetween, and hence the strength of the torque transmitting portion is enhanced. As a result, the bearing device for a vehicle is light-weighted and downsized.

Figure 10A:
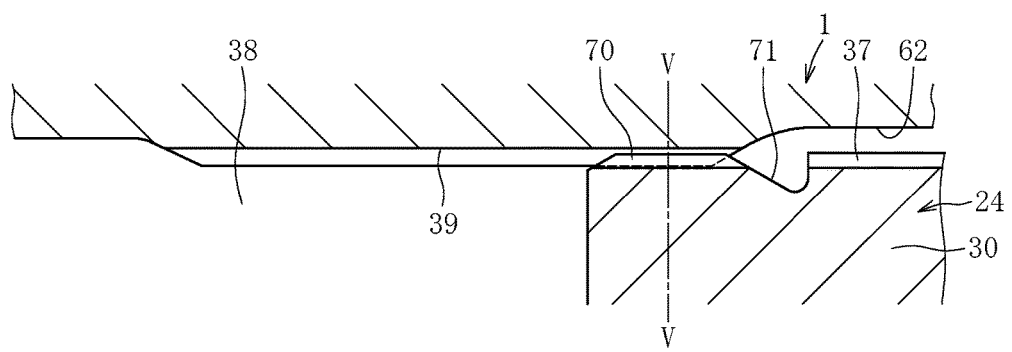
FIG. 10(A) is a sectional view of a bearing device for a wheel according to another embodiment of the present invention, for illustrating a state in which guiding convex portions of a stem section are fitted to concave portions of a hub wheel.
Figure 10B:
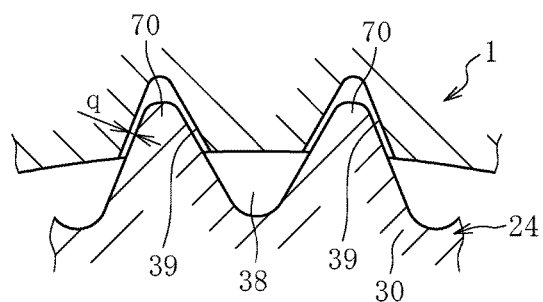
FIG. 10(B) is a sectional view taken along the line V-V of FIG. 10(A).

In the above-mentioned embodiment, description is made of the case of defining the guide portion by the guiding concave portions 65 formed in the inner peripheral surface of the hub wheel 1, but the present invention is not limited thereto. The guide portion may be formed on the outer peripheral surface of the stem section 30 of the outer joint member 24. For example, in an embodiment of the present invention illustrated in FIG. 10 to FIG. 13, guiding convex portions 70 serving as the guide portion are formed on the outboard side of the convex portions 37 of the stem section 30. Each of the guiding convex portions 70 is smaller than each of the convex portions 37 in cross section orthogonal to an axis of the outer joint member, and each of the guiding convex portions 70 is fitted to each of the small concave portions 39 of the inner peripheral surface of the hub wheel 1 with a gap q {see FIG. 10(B)}. The guiding concave portions 65 (see an enlarged part of FIG. 1) are not formed in the inner peripheral surface of the hub wheel 1 unlike the above-mentioned embodiment, but the small concave portions 39 are extended to an interface with the fitting surface 62 {see FIG. 10(A)}. An annular recessed groove 71 is formed in an axial region between the convex portions 37 and the guiding convex portions 70 of the stem section 30.

Figure 11:
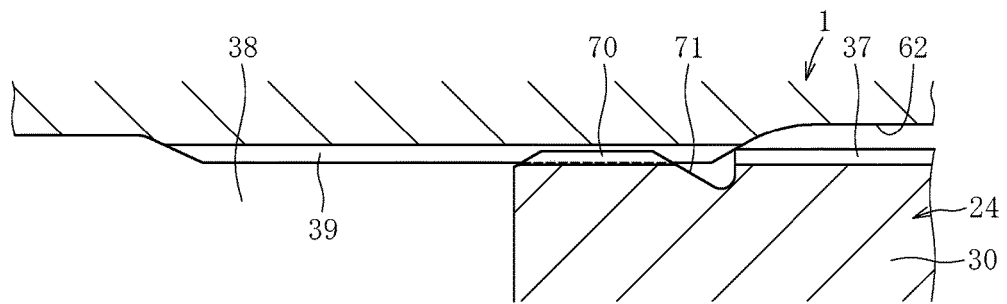
FIG. 11 is a sectional view for illustrating a state immediately before press-fitting the convex portions of the stem section of FIG. 10 into the concave portions of the hub wheel.
Figure 12A:
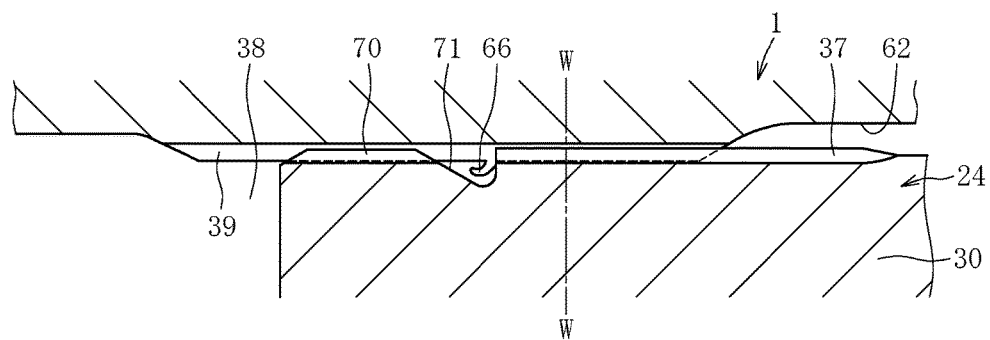
FIG. 12(A) is a sectional view for illustrating a state in the middle of press-fitting the convex portions of the stem section of FIG. 10 into the concave portions of the hub wheel.
Figure 12B:
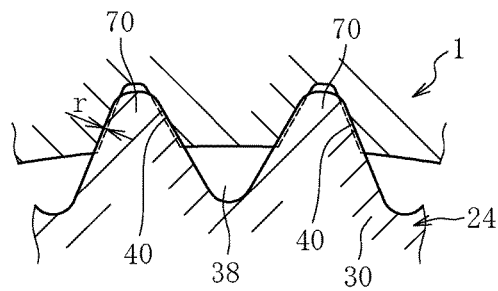
FIG. 12(B) is a sectional view taken along the line W-W of FIG. 12(A).
Figure 13:
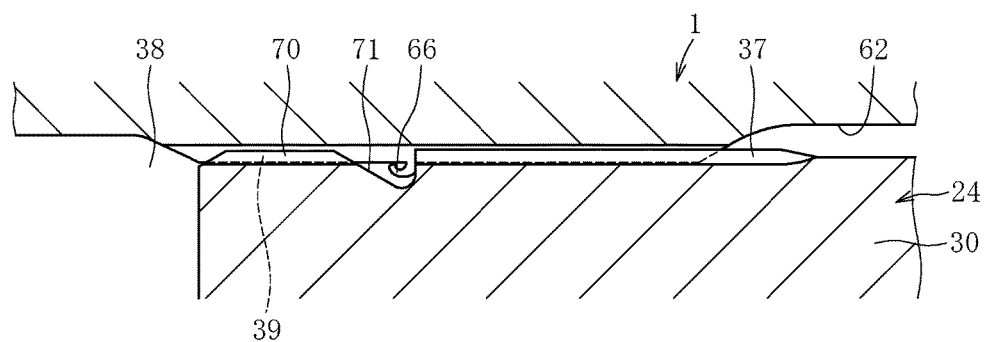
FIG. 13 is a sectional view for illustrating a state in which press fitting of the stem section of FIG. 10 into the hub wheel is completed.
Figure 14:
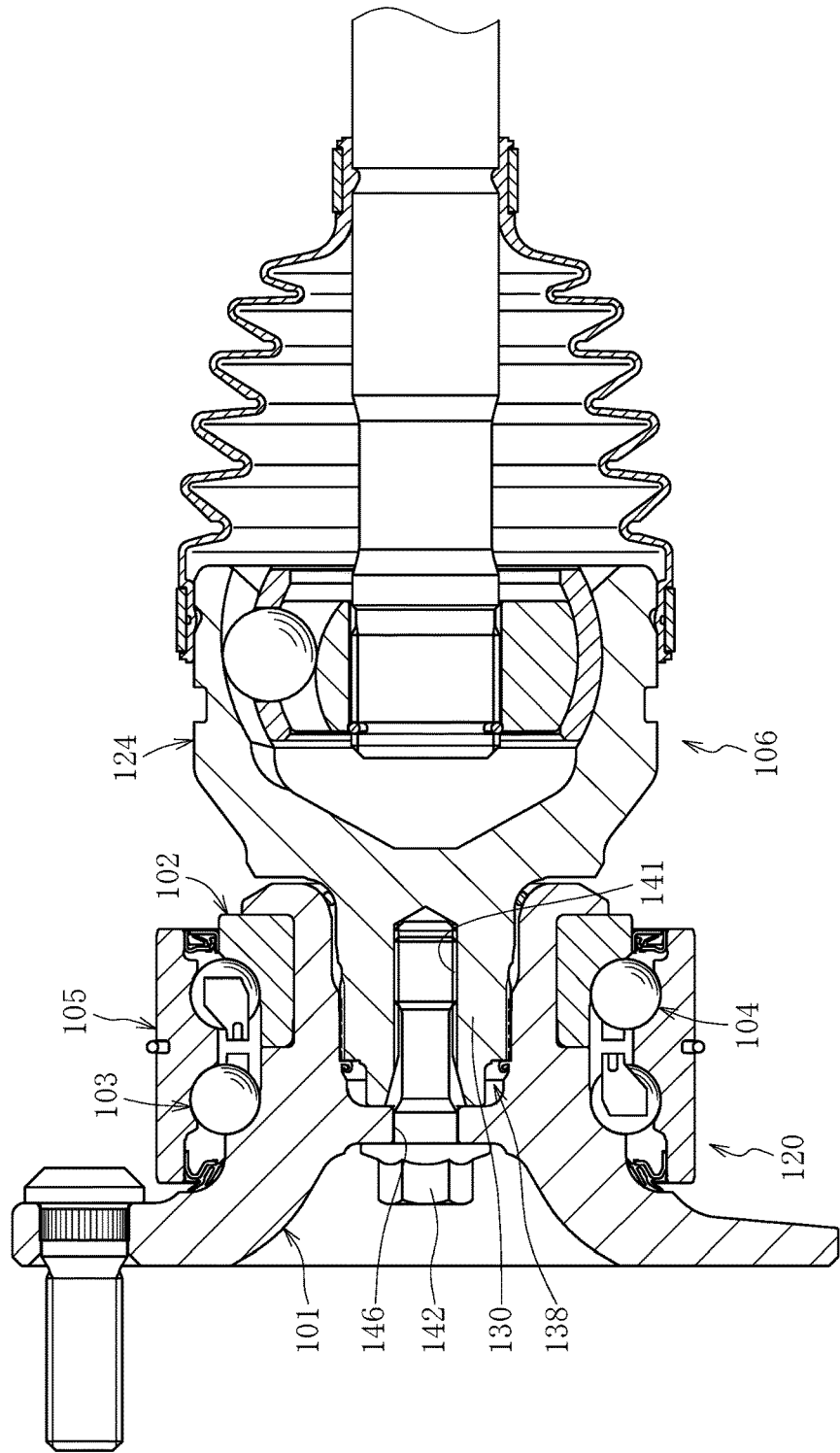
FIG. 14 is a vertical sectional view for illustrating an entire configuration of a related-art bearing device for a wheel.

When the above-mentioned outer joint member 24 is mounted to the hub wheel 1, first, while fitting the stem section 30 of the outer joint member 24 onto the fitting surface 62 of the hub wheel 1, the guiding convex portions 70 of the stem section 30 are fitted to the small concave portions 39 of the hub wheel 1 (see FIG. 10). Then, as illustrated in FIG. 11, under a state in which an entire axial range of the guiding convex portions 70 and the small concave portions 39 are fitted to each other with a gap therebetween before the convex portions 37 of the stem section 30 and the concave portions 40 of the hub wheel 1 are fitted to each other (before the convex portions 37 are press-fitted into the small concave portions 39), the maximum inclination angle $\theta_2$ of the bolt 42 with respect to the hub wheel 1, which is inserted through the bolt insertion hole 46 of the hub wheel 1, is set to be larger than the maximum inclination angle $\theta_1$ of the outer joint member 24 with respect to the hub wheel 1 (see FIG. 9). Under this state, the bolt 42 is threadedly engaged and fastened into the bolt hole 41 of the stem section 30. Owing to a force of fastening the bolt 42 at this time, the convex portions 37 of the stem section 30 are press-fitted into the small concave portions 39 with interferences r, thereby forming the concave portions 40 that are held in close contact with the convex portions 37 in the entire range of the fitting portion X (see FIG. 12). At this time, the annular recessed groove 71 of the stem section 30 functions as the receiving portion configured to receive the flash portion 66 that is generated by transferring the profile of each of the convex portions through press fitting. After that, the staked portion 11 of the hub wheel 1 formed at an end portion on the inboard side and a shoulder portion 45 of the outer joint member 24 are brought into abutment on each other, thereby completing mounting of the constant velocity universal joint 6 to the hub wheel 1 (see FIG. 2 and FIG. 13).

Further, in the above-mentioned embodiments, description is made of the case of forming the small concave portions 39 in the inner peripheral surface of the shaft hole 38 of the hub wheel 1, and forming the convex portions 37 on the outer peripheral surface of the stem section 30. However, conversely, the small concave portions may be formed in the outer peripheral surface of the stem section 30, and the convex portions may be formed on the inner peripheral surface of the shaft hole 38 of the hub wheel 1 (not shown). In this case, the convex portions of the hub wheel 1 are press-fitted into the small concave portions of the stem section 30 so that profiles of the convex portions are transferred onto the small concave portions. Thus, the concave portions that are held in close contact with the convex portions in an entire range of a fitting region therebetween are formed in the stem section.

Further, the above-mentioned embodiments exemplify the case where the present invention is applied to a bearing device for a driving wheel of the type in which one of the double-row inner raceway surfaces 7 and 8 formed on the inner member comprising the hub wheel 1 and the inner ring 2, that is, the inner raceway surface 7 on the outboard side is formed on the outer periphery of the hub wheel 1 (referred to as "third generation"). However, the present invention is not limited thereto, but is also applicable to a bearing device for a driving wheel of the type in which a pair of inner rings is press-fitted to the outer periphery of the hub wheel and the raceway surface 7 on the outboard side is formed on the outer periphery of one of the inner rings, whereas the raceway surface 8 on the inboard side is formed on the outer periphery of the other of the inner rings (referred to as "first generation" and "second generation").

The present invention is not limited to the above-mentioned embodiments. As a matter of course, the present invention may be carried out in various other embodiments without departing from the gist of the present invention. The scope of the present invention is defined by the claims, and encompasses meanings of equivalents of elements described in the claims and all modifications within the scope of the claims.

REFERENCE SIGNS LIST 1 hub wheel (inner member)
2 inner ring (inner member)
3, 4 rolling element
5 outer ring (outer member)
6 constant velocity universal joint
7, 8 inner raceway surface
13, 14 outer raceway surface
15, 16 retainer
20 bearing for wheel
21 drive shaft
24 outer joint member
26 inner joint member
27 ball
28 cage
29 mouth section
30 stem section
31 boot
37 convex portion
39 small concave portion
40 concave portion
41 bolt hole
42 bolt
65 guiding concave portion (guide portion)
M convex and concave fitting structure
$\theta_1$ maximum inclination angle of outer joint member with respect to hub wheel
$\theta_2$ maximum inclination angle of bolt with respect to hub wheel

The invention claimed is:

1. An assembling method for a bearing device for a wheel, the bearing device comprising:
   a bearing comprising:
      an outer member;
      an inner member comprising a hub wheel and an inner ring; and
      double-row rolling elements arranged between double-row outer raceway surfaces formed on an inner periphery of the outer member, and double-row inner raceway surfaces formed on an outer periphery of the inner member;
   a constant velocity universal joint comprising:
      an outer joint member comprising a mouth section and a stem section;
      an inner joint member accommodated in the mouth section; and
      a plurality of torque transmitting members arranged between the outer joint member and the inner joint member;
   convex portions, which extend in an axial direction, formed on any one of an outer peripheral surface of the stem section and an inner peripheral surface of the hub wheel;
   concave portions, which extend in the axial direction, formed on another one of the outer peripheral surface of the stem section and the inner peripheral surface of the hub wheel, the concave portions being fitted to the convex portions so as to allow torque transmission; and
   a guide portion formed on the outer peripheral surface of the stem section or the inner peripheral surface of the hub wheel,
   the assembling method comprising:
      mounting the bearing to a vehicle body;
      inserting the stem section of the outer joint member into an inner periphery of the hub wheel of the bearing from an inboard side;

fitting an entire range of the guide portion to the stem section or the hub wheel with a gap therebetween to guide a start of fitting between the convex portions and the concave portions;

inserting a bolt from an outboard side through a bolt insertion hole formed in the hub wheel in a state where the outer joint member is inclined by its own weight against the hub wheel without being lifted, a maximum inclination angle of the bolt with respect to the hub wheel is set to be larger than a maximum inclination angle of the outer joint member with respect to the hub wheel; and connecting the bearing and the constant velocity universal joint to each other by threadedly engaging and fastening the bolt into a bolt hole formed in an end portion of the stem section on the outboard side, and forming the concave portions by cutting the another one of the outer peripheral surface of the stem section and the inner peripheral surface of the hub wheel by the convex portions.

2. The assembling method for the bearing device for a wheel according to claim 1, further comprising forming small concave portions on the another one of the outer peripheral surface of the stem section and the inner peripheral surface of the hub wheel, wherein the concave portions are formed by cutting inner walls of the small concave portions by the convex portions, and the convex portions and the concave portions are held in close contact with each other in an entire range of a fitting portion therebetween.

3. The assembling method for the bearing device for a wheel according to claim 2, wherein the guide portion comprises guiding concave portions formed on a press-fitting start side of the small concave portions to extend in the axial direction.

4. The assembling method for the bearing device for a wheel according to claim 2, wherein the concave portions are formed by cutting the inner walls of the small concave portions by only circumferential side wall portions of the convex portions.

* * * * *